(No Model.)

H. B. UTTER.
POTATO DIGGER.

No. 343,554. Patented June 8, 1886.

2 Sheets—Sheet 1.

Witnesses.
A. O. Behel
A. C. Brearly

Inventor.
Horace B. Utter
Per Jacob Behel.
Atty.

(No Model.) 2 Sheets—Sheet 2.

H. B. UTTER.
POTATO DIGGER.

No. 343,554. Patented June 8, 1886.

Witnesses.
A. O. Behel
A. C. Brearly

Inventor.
Horace B. Utter.
Per Jacob Behel,
Atty.

UNITED STATES PATENT OFFICE.

HORACE B. UTTER, OF ROCKFORD, ILLINOIS, ASSIGNOR TO THE UTTER MANUFACTURING COMPANY, OF SAME PLACE.

POTATO-DIGGER.

SPECIFICATION forming part of Letters Patent No. 343,554, dated June 8, 1886.

Application filed September 2, 1885. Serial No. 175,989. (No model.)

*To all whom it may concern:*

Be it known that I, HORACE B. UTTER, a citizen of the United States, residing in the city of Rockford, in the county of Winnebago and State of Illinois, have invented a new and useful Potato-Digger, of which the following is a specification.

This invention relates to horse-power potato-diggers. Its object is to combine a potato-digger with a wheeled cultivator; and it consists in the combination of a potato-digger with the wheeled supporting-frame and with the drag-bars of a cultivator, and in the attachments required to produce the combination represented in the accompanying drawings, in which—

Figure 1:
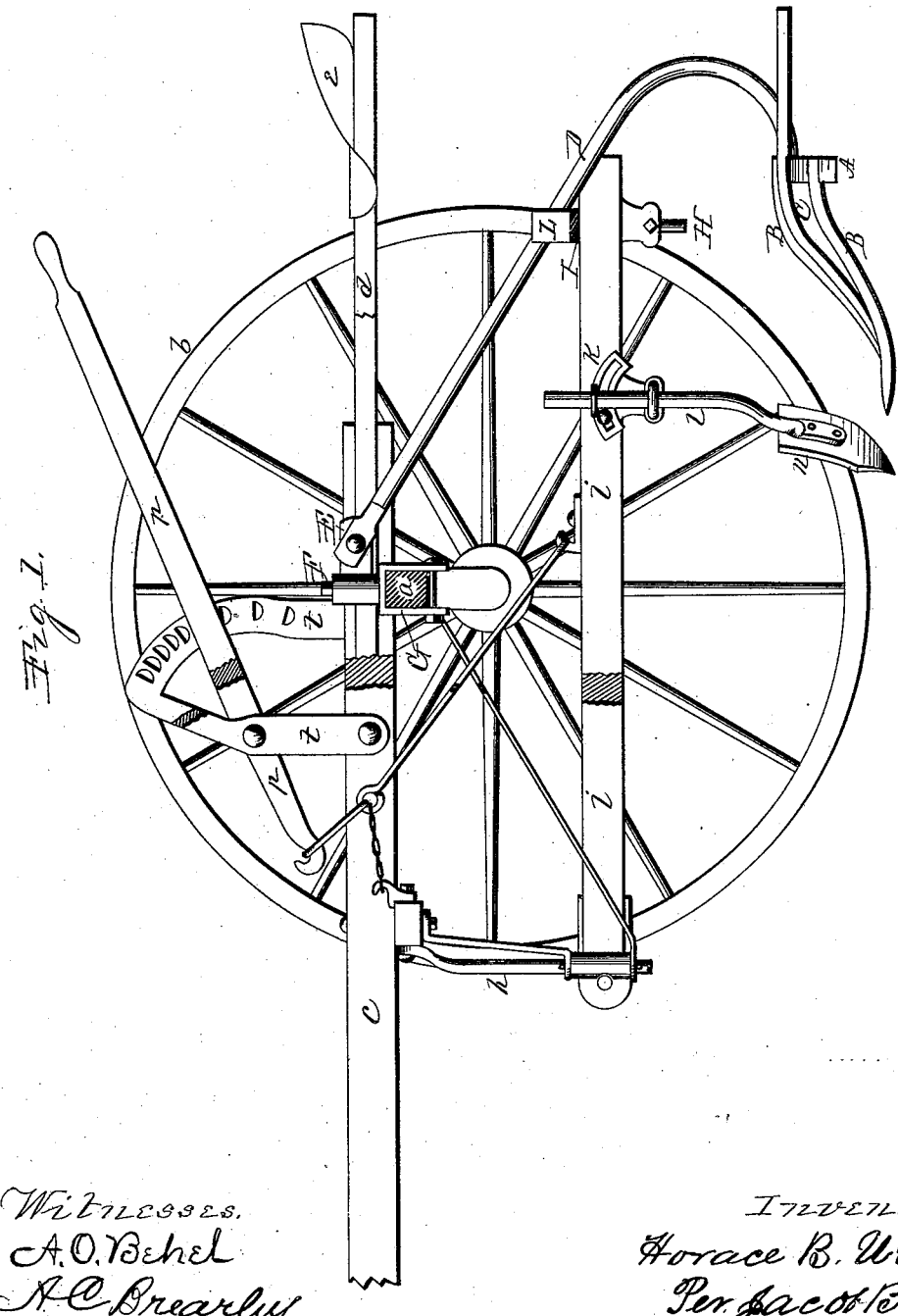
Figure 2:
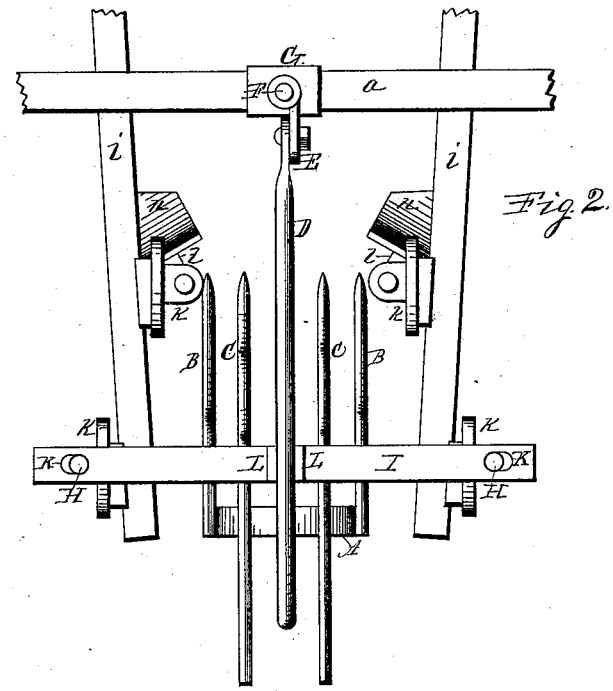
Figure 3:
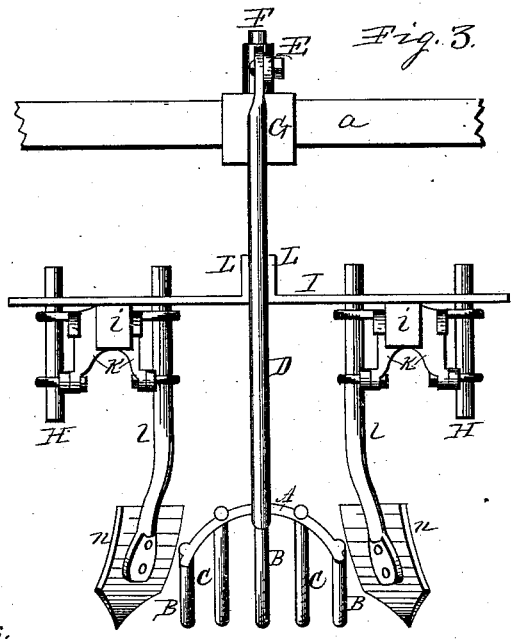

Figure 1 is a side elevation of a combined wheeled cultivator and potato-digger embodying my invention, and in which portions of the cultivator are omitted or broken away to more clearly show the parts. Fig. 2 is a plan view showing the digger and the portions of a cultivator with which it is immediately connected, and Fig. 3 is a rear elevation of the digger and the parts of a cultivator to which it is attached.

The several parts represented in the several figures of the accompanying drawings, consisting of an axle-tree, $a$, with axle-arms fixed to its end portions and carrying wheels $b$, mounted to revolve thereon, a tongue-frame, $c$, fixed to the axle-tree and extending forward therefrom, a seat-frame, $d$, fixed to the supporting-frame and extending rearward with a seat, $e$, fixed on its rear end, the pendants $h$, with drag-bars $i$, having their forward ends hinge-jointed to the lower ends of the pendants and extending rearward therefrom under the axle-tree, shovel-standard safety-fastenings $k$, fixed to the drag-bars, and shovel-standards $l$, with shovels $n$ fixed thereto, supported in the standard fastening, the lifting and holding levers $p$, their ratchet-supports $t$, their link-connection with the supporting-frame and with the drag-bars, and their pawl-connection with the ratchet-supports, including the mechanical construction and attachments of these several parts, are substantially the same, for the same purpose, and operate in the same manner as like parts of the cultivator secured by United States Patent No. 197,503, to Morris L. Utter, dated November 27, 1877.

The potato-digger in this instance consists of a curved bar, A, and digger-fingers B and C, and a curved beam, D. The digger-fingers are fixed at proper intervals to the curved bar A, and from their connection therewith extend forward, inclining downward to place their pointed forward ends in the same horizontal plane. The digger-fingers C on each side of the center finger, extend rearward of the curved bar to which they are fixed. The beam D is fixed at one end to the crowning center of the curved bar A, and from its connection therewith extends rearward, curving upward and forward, with its free end extending forward and upwardly inclined. The digger is placed between the rear ends of the drag-bars in position to engage the ground, and the forward end of the curved beam is, in this instance, pivot-jointed to an arm, E, extending rearward from its pivotal connection with the central portion of the axle-tree. The arm E, pivoted on a vertical stud, F, rises centrally from a yoke-clip, G, embracing the axle-tree to which it is fixed. This connection of the digger with the axle-tree permits a vertical and lateral movement of the digger. Said standards H are held in the rear standard-fastenings fixed to the drag-bars, and extend upward. A coupling-bar, I, is provided with elongated holes K near its end portions, which receive the uprising end portions of the stud-standards, to hold the drag-bars in their relative positions laterally to move in unison, but capable of independent vertical movements. The central portion of the coupling-bar receives the curved beam of the digger, to limit its downward movement and to control its running depth. Arms L are fixed to the central portion of the coupling-bar, and rise on each side of the digger-beam, to hold it in position and control the lateral movements of the digger relatively with the drag-bars. The connection of the digger with the drag-bars of the cultivator to be operated by the lifting and holding mechanism of the cultivator places it under the control of the operator mounted in his seat on the machine.

In use the forward shovels, $n$, are adjusted to the proper running depth relatively with the digger, and the face of the shovels are preferably inclined to the line of draft outward to cast the earth cut by the shovels outward on each side of the row, to leave the center, containing the vegetables to be lifted by the digger, cut free on both sides.

In the use of my improved machine that portion of the row containing the vegetables will be lifted by the digger, will pass rearward over the fingers, and in its passage will be broken, and portions thereof will be sifted through the openings between the fingers, and the vegetables carried over the digger will in the main be found on the surface.

In this instance I have combined the digger with the cultivator represented in the drawings, but do not wish to confine myself to the combination with this particular machine, as it is capable of use in connection with most varieties of wheeled straddle-row cultivators known as "riding" or "walking" cultivators. I have also in this instance connected the forward end of the digger-beam with the axle-tree of the cultivator; but instead thereof it may be connected with any other convenient portion of the supporting or wheeled frame of the machine without departing from the principle of my invention.

I claim as my invention—

1. In combination with a wheeled supporting-frame and a bar connecting the rear portion of the drag-bars, a potato-digger having a hinge-connection with the supporting-frame, and a steady connection with the coupling-bar, substantially as and for the purpose set forth.

2. The combination, with the supporting-frame and the drag-bars of a straddle-row cultivator, of a potato-digger, said digger having a hinge-connection with the supporting-frame and a steady support with a coupling having a free joint-connection with the drag-bars, substantially as and for the purpose set forth.

3. The combination, with the supporting-frame and the drag-bars of a straddle-row cultivator, of a potato-digger consisting of a curved arm carrying digger-teeth at its lower end and hinged to the supporting-frame, a coupling-bar having slotted connections with the drag-bars, and a steady support for the digger-bar upon the coupling-bar, substantially as described.

HORACE B. UTTER.

Witnesses:
A. O. BEHEL,
JACOB BEHEL.